United States Patent
Zerbino (12)

(10) Patent No.: US 12,129,626 B2
(45) Date of Patent: Oct. 29, 2024

(54) SYSTEM AND METHOD FOR CONTROLLING OPERATION OF A WORK MACHINE

(71) Applicant: KUBOTA CORPORATION, Osaka (JP)

(72) Inventor: Fulvio Zerbino, Crepy-en-Valois (FR)

( * ) Notice: Subject to any disclaimer, the term of this patent is extended or adjusted under 35 U.S.C. 154(b) by 264 days.

(21) Appl. No.: 17/749,304

(22) Filed: May 20, 2022

(65) Prior Publication Data

US 2022/0389678 A1    Dec. 8, 2022

(30) Foreign Application Priority Data

Jun. 7, 2021   (EP) .................................... 21305775

(51) Int. Cl.
*E02F 9/20* (2006.01)
*E02F 9/26* (2006.01)

(52) U.S. Cl.
CPC ............ *E02F 9/2029* (2013.01); *E02F 9/264* (2013.01)

(58) Field of Classification Search
CPC ................................ E02F 9/2029; E02F 9/264
See application file for complete search history.

(56) References Cited

U.S. PATENT DOCUMENTS

| 2008/0228353 | A1 | 9/2008 | Mayfield |
| 2011/0054729 | A1 | 3/2011 | Whitehead |
| 2016/0057921 | A1 | 3/2016 | Pickett |
| 2017/0209530 | A1 | 9/2017 | Heng et al. |
| 2017/0359941 | A1 | 12/2017 | Czapka |

FOREIGN PATENT DOCUMENTS

| EP | 1832157 A1 | 9/2007 |
| EP | 3794933 A1 | 3/2021 |
| WO | 2017058006 A1 | 4/2017 |

*Primary Examiner* — Michael D Lang
(74) *Attorney, Agent, or Firm* — Cabinet Beau de Lomenie; Jonathan Bingham; Brian Gordaychik (57) ABSTRACT

A system including a sensor configured to detect an orientation of the vehicle, a vehicle ECU configured to communicate with the sensor and with a work machine, a work machine ECU configured to communicate with the vehicle and to control performance of a work function of the work machine, and wherein, the sensor is configured to communicate a detected orientation of the vehicle to the vehicle ECU, the vehicle ECU is configured to transmit a signal to the work machine ECU if the detected orientation is outside of target parameters corresponding to an orientation of the vehicle, and the signal is configured to notify the work machine ECU of the detected orientation and/or modify operation of a work function performed by the work machine.

11 Claims, 2 Drawing Sheets

SYSTEM AND METHOD FOR CONTROLLING OPERATION OF A WORK MACHINE

FIELD

The present disclosure relates generally to the field of work vehicles and work machines. More specifically, the present disclosure relates to a system for controlling operation of a work machine in combination with a work vehicle.

BACKGROUND

A work vehicle, such as a tractor, is typically operated in combination with one or more work machine, such as an agricultural implement, in order to carry out and/or perform farm work. Accordingly, the work vehicle may be retrofitted and/or customized with the work machine in order to carry out and/or perform an intended form of farm work, such as soil cultivation, planting, fertilizing, irrigation, harvesting, and/or hay making.

In such a combination between a work vehicle and a work machine, it is common that work vehicles and work machines of different manufacturers are frequently combined with each other. As such, it has been promulgated and established that connection and compatibility between work vehicles and work machines of different manufacturers is possible. As such, international standard ISO 11783 (ISO-BUS), based on a control area network (CAN), has been developed and promulgated by the Agricultural Industry Electronics Foundation (AEF) as a communication protocol for the agriculture industry. Particularly, ISO 11783 defines a communication protocol for exchanging, between a work vehicle and a work machine, information concerning operation of the work vehicle and/or the work machine.

Many modern work vehicles and work machines also typically include a tractor implement management (TIM) system. The TIM system is an ISOBUS-based solution for a cross-manufacturer agricultural technology system, which may enable a work machine to control certain operation and/or functions of the work vehicle and vice versa. More specifically, the TIM system allows for interactive communication between the work vehicle and the work machine, such that the work vehicle and the work machine may automatically perform farm work without significant input from a user.

In a work vehicle and work machine combination in which the work vehicle and the work machine automatically performs farm work, independent of significant input from a user, the work machine may perform a specific work function of the farm work even though the work vehicle and/or the work machine is improperly positioned for performance of the work function of the farm work. In this scenario, the judgment of a user or the like is usually required to determine whether the work vehicle and/or the work machine are properly positioned for performance of the work function. However, requiring a user for additional judgment in an automatic system results in increased costs and/or exposure of the user to unsafe conditions in order to perform the farm work.

It is desirable to provide an improved system for controlling operation of a work machine which is capable of taking into account an orientation of the work vehicle to enhance operation of the work machine and/or performance of a work function by the work machine.

SUMMARY

According to aspects of the present disclosure, a system for controlling operation of a work machine is provided, the work machine being configured to operate in combination with a vehicle to perform a work function, the system comprising a sensor included by the vehicle, the sensor being configured to detect an orientation of the vehicle, a vehicle electronic control unit being configured to communicate with the sensor and with the work machine, a work machine electronic control unit being configured to communicate with the vehicle and to control performance of a work function of the work machine, and wherein, the sensor is configured to communicate a detected orientation of the vehicle to the vehicle electronic control unit, the vehicle electronic control unit is configured to transmit a signal to the work machine electronic control unit if the detected orientation of the vehicle is outside of target parameters corresponding to an orientation of the vehicle, and the signal is configured for one or more of notifying the work machine electronic control unit of the detected orientation of the vehicle and modifying operation of a work function performed by the work machine.

According to aspects of the present disclosure, the vehicle electronic control unit is configured so that an operator selects the parameters corresponding to an orientation of the vehicle.

According to aspects of the present disclosure, wherein the vehicle electronic control unit is configured so that an operator selects functions of the vehicle to be considered with respect to the parameters corresponding to an orientation of the vehicle.

According to aspects of the present disclosure, the system further comprises a calculation unit being configured to process the detected orientation of the vehicle, wherein the signal transmitted from the vehicle electronic control unit to the work machine electronic control unit is configured to be an error code corresponding to the processing of the detected orientation by the calculation unit.

According to aspects of the present disclosure, the error code is configured to include a value within a range of values that are defined as manufacturer specific by international standard ISO 11783.

According to aspects of the present disclosure, the sensor is configured to determine one or more of a pitch angle of the vehicle, a roll angle of the vehicle, and a yaw angle of the vehicle.

According to aspects of the present disclosure, the parameters corresponding to an orientation of the vehicle correspond to one or more of a pitch angle of the vehicle, a roll angle of the vehicle, and a yaw angle of the vehicle.

According to aspects of the present disclosure, the vehicle electronic control unit is configured to transmit measurements corresponding to one or more of auxiliary valve flow or auxiliary valve state of the vehicle, front power take-off RPM of the vehicle, rear power take-off RPM of the vehicle, engine RPM of the vehicle, front hitch position of the vehicle, rear hitch position of the vehicle, and speed of the vehicle.

According to aspects of the present disclosure, the work machine electronic control unit is configured to generate data based upon transmission of the signal from the vehicle electronic control unit.

According to aspects of the present disclosure, wherein the vehicle electronic control unit is configured to detect an orientation of the work machine based upon the detected orientation of the vehicle.

According to aspects of the present disclosure, wherein the vehicle electronic control unit is configured so that an operator selects parameters corresponding to an orientation of one or more of the vehicle and the work machine.

According to aspects of the present disclosure, a method for controlling operation of a work machine is provided, the work machine being configured to operate in combination with a vehicle to perform a work function, the method comprising selecting parameters corresponding to an orientation of the vehicle, detecting an orientation of the vehicle with a sensor included by the vehicle, communicating a detected orientation of the vehicle to the vehicle electronic control unit, and transmitting a signal from the vehicle electronic control unit to the work machine electronic control unit if the detected orientation of the vehicle is outside of the parameters corresponding to an orientation of the vehicle, the signal being configured for one or more of notifying the work machine electronic control unit of the detected orientation of the vehicle and modifying operation of a work function performed by the work machine.

According to aspects of the present disclosure, the method further comprises processing the detected orientation of the vehicle with a calculation unit, wherein transmitting a signal from the vehicle electronic control unit to the work machine electronic control unit includes the signal being configured to be an error code corresponding to the processing of the detected orientation by the calculation unit.

According to aspects of the present disclosure, the signal being configured to be in the form of an error code includes the error code being configured to comprise a value within a range of values that are defined as manufacturer specific by international standard ISO 11783.

According to aspects of the present disclosure, detecting an orientation of the vehicle with the sensor includes determining one or more of a pitch angle of the vehicle, a roll angle of the vehicle, and a yaw angle of the vehicle.

According to aspects of the present disclosure, selecting parameters corresponding to an orientation of the vehicle includes the parameters corresponding to one or more of a pitch angle of the vehicle, a roll angle of the vehicle, and a yaw angle of the vehicle.

In the manner described and according to aspects illustrated herein, the system and the method for controlling operation of a work machine automatically detects an orientation of the vehicle and controls operation of the work machine in correspondence with the detected orientation of the vehicle, in order to enhance operation of the work machine and/or performance of a work function by the work machine, without requiring a user or the like for additional judgment and/or guidance.

BRIEF DESCRIPTION OF THE DRAWINGS

Aspects of an embodiment will be described in reference to the drawings, where like numerals reflect like elements.

DETAILED DESCRIPTION

An embodiment of a system for controlling operation of a work machine according to aspects of the disclosure will now be described with reference to FIGS. 1-2, wherein like numerals represent like and/or functionally similar parts. The system will generally be referred to by the reference numeral 10. Although the system 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Additionally, the language used herein has been principally selected for readability and instructional purposes, and may not have been selected to delineate or circumscribe inventive subject-matter. Accordingly, the disclosure of the present disclosure is intended to be illustrative, but not limiting, of the scope of the disclosure, which is set forth in the claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present inventive subject matter.

Unless specifically stated otherwise as apparent from the following discussion, it is appreciated that throughout the description, discussions utilizing terms such as "processing," "computing," "calculating," "determining," "displaying," "estimating," "determining," or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein. It should be noted that the process steps and instructions of the present disclosure may be embodied in software, firmware, and/or hardware, and when embodied in software, could be downloaded to reside on and be operated from different platforms used by a variety of operating systems.

The present disclosure also relates to control devices (each being referred to herein as an "electronic control unit") for performing the operations of the system 10 discussed herein. The control devices may be specially constructed for the required purposes, or the control devices may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memory (ROM), random access memory (RAM), erasable programmable read-only memory (EPROM), electrically erasable programmable read-only memory (EEPROM), magnetic or optical cards, reduced instruction set computer (RISC), application specific integrated circuit (ASIC), or any type of media suitable for storing electronic instructions, and each coupled to a computer system bus. Furthermore, the computers referred to herein may include a single processor or architectures employing multiple processor designs for increased computing capability.

The computers presented herein are not inherently related to any particular computer or other apparatus. Various general-purpose systems may also be used with programs in accordance with aspects presented herein, or it may prove convenient to construct a more specialized apparatus to perform required method steps. The required structure for a variety of these systems will appear from the aspects disclosed herein. In addition, the present disclosure is not described with reference to any particular programming language. It will be appreciated that a variety of programming languages may be used to implement the teachings of the present disclosure as described herein, and any references below to specific languages are provided for disclosure of enablement and best mode of the present disclosure.

Figure 1:
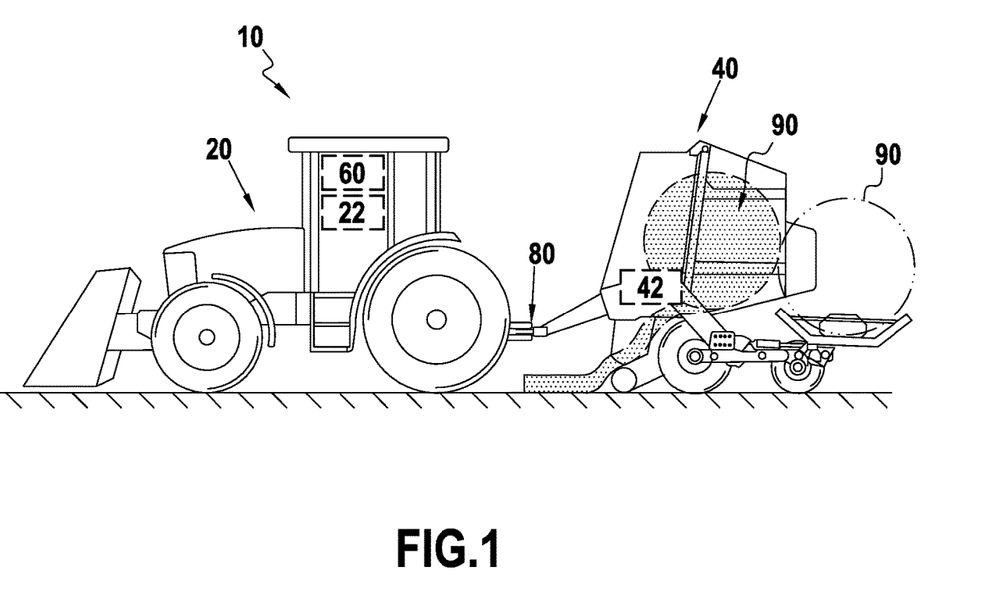
FIG. 1 is a side view of a system for controlling operation of a work machine, in use in a work vehicle and a work machine.
Figure 2:
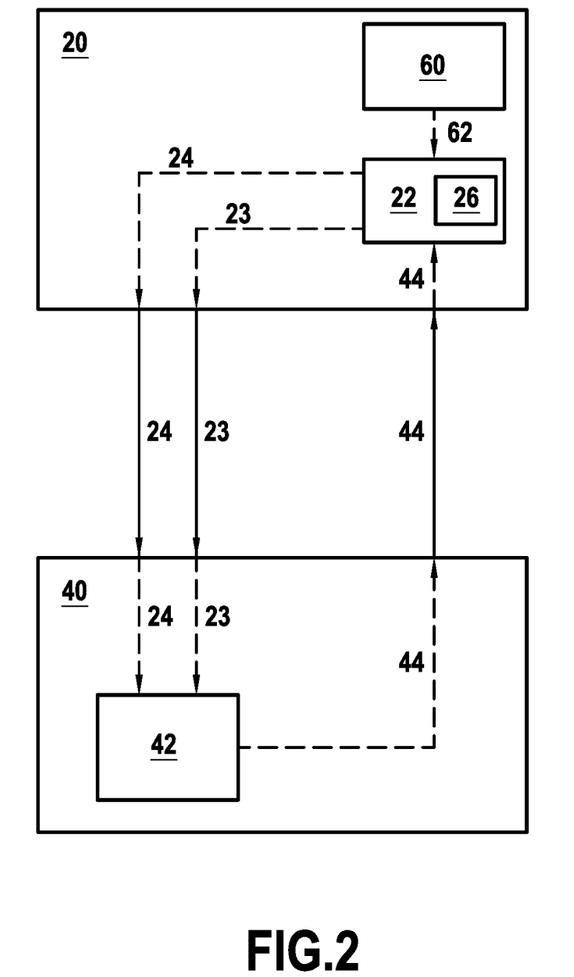
FIG. 2 is a schematic representation of the system for controlling operation of a work machine.

As shown in FIGS. 1-2, a system for controlling operation of a work machine (hereafter, "the system") 10 is disclosed. It is contemplated that the system 10 may be described and/or implemented as a method. Referring to FIG. 1, the system 10 includes a vehicle 20, one or more implement (also referred to herein as a "work machine") 40, and one or more sensor 60. To control operation of the implement 40, the system 10 may be configured to be incorporated into software and/or hardware which may be included by the vehicle 20, the implement 40, and/or the sensor 60.

In the disclosed embodiment, the vehicle 20 is an agricultural vehicle and/or work vehicle. Particularly, in the disclosed embodiment, the vehicle 20 is a tractor configured to carry out farm work. Additionally, the vehicle 20 is configured for use in combination with the implement 40. Additionally or alternatively, it is contemplated that the vehicle 20 may be configured for use with a plurality of implements 40. However, the plurality of implements 40 will be referred to herein as "the implement 40," unless reference to a plurality of implements 40 is otherwise necessary. In the disclosed embodiment, the implement 40 is an agricultural machine and/or work machine. Particularly, in the disclosed embodiment, the implement 40 is configured to perform a work function and/or the farm work. As such, the implement 40 may be a baler, a plow, a tiller, a seeder, a sprayer, a swather, and/or the like. Additionally, it is contemplated that the implement 40 may be configured for use frontward of the vehicle 20, rearward of the vehicle 20, at a side of the vehicle 20, above of the vehicle 20, and/or beneath the vehicle 20. It is contemplated that the terms "frontward," "rearward," "side," "above," and "beneath" may be understood relative to a direction in which the vehicle 20 is travelling.

As shown in FIG. 1, there is a physical connection 80 between the vehicle 20 and the implement 40. Additionally, the vehicle 20, the implement 40, and the sensor 60 are configured to communicate. It is contemplated that the vehicle 20, the implement 40, and the sensor 60 are configured to communicate via a wired connection, a wireless connection, or any other manner of transmitting information which may be compatible with the system 10. Additionally, the vehicle 20 and the implement 40 may be communicatively connected by, for example, the international standard ISO 11783, which is called ISOBUS and based on a control area network (CAN). Additionally, the vehicle 20 and the implement 40 may each include a tractor implement management (TIM) system. It is contemplated that a TIM system as referred to herein may be understood to be an ISOBUS-based agricultural technology system enabling compatibility and interactive communication between the vehicle 20 and the implement 40, which may each be products that are different in manufacturer. In the disclosed embodiment, certain operations of the vehicle 20 may be determined by the implement 40. Additionally or alternatively, certain operations of the implement 40 may be determined by the vehicle 20. As such, the TIM system is configured to facilitate bidirectional communication. In view of the TIM system, the vehicle 20 may be understood as and/or referred to herein as a "resource provider" and the implement 40 may be understood as and/or referred to herein as a "resource manager." Additionally, the vehicle 20 may be understood as an owner of TIM functions, and thereby referred to herein as a "TIM server." Additionally, the implement 40 may be understood as a generator of TIM commands, and thereby referred to herein as a "TIM client." In the disclosed embodiment, the sensor 60 is configured to acquire information to be exchanged in the bidirectional communication of the vehicle 20 and the implement 40. In this manner, the system 10 allows for improved operation of the implement 40 and/or performance of a work function by the implement 40 in the completion of farm work with a TIM system.

As shown in FIGS. 1-2, the vehicle 20 is configured to operate in combination with the implement 40. To this end, the vehicle 20 is configured to communicate with the implement 40. In the disclosed embodiment, the vehicle 20 includes one or more vehicle electronic control unit (ECU) (also understood as and/or referred to herein as the "vehicle electronic control system" and/or the "first electronic control unit") 22. The vehicle ECU 22 is configured to communicate with the implement 40. Particularly, the vehicle ECU 22 is configured to communicate with an implement electronic control unit (ECU) 42 included by the implement 40 (discussed further below). To this end, as shown in FIG. 2, the vehicle 20 is configured to transmit measurements 23 to the implement 40. Particularly, the vehicle ECU 22 is configured to transmit the measurements 23 to the implement ECU 42. It is contemplated that the vehicle ECU 22 is configured to transmit the measurements 23 continuously, in real-time, to the implement ECU 42. In the disclosed embodiment, the measurements 23 may correspond to one or more of a plurality of TIM functions that are configured to control aspects of the vehicle 20. In the disclosed embodiment, the TIM functions include one or more of auxiliary valve control, front power take-off (PTO) control, rear PTO control, front hitch control, rear hitch control, vehicle speed control, and vehicle auto-guidance control. As such, the measurements 23 may include auxiliary valve flow and/or auxiliary valve state of the vehicle 20, front PTO revolutions per minute (RPM) of the vehicle 20, rear PTO RPM of the vehicle 20, engine RPM of the vehicle 20, front hitch position of the vehicle 20, rear hitch position of the vehicle 20, speed of the vehicle 20, auto-guidance curvature of the vehicle 20, and the like. Additionally or alternatively, the vehicle 20 is configured to transmit a first signal 24 to the implement 40. Particularly, as shown in FIG. 2, the vehicle ECU 22 is configured to transmit the first signal 24 to the implement ECU 42. The first signal 24 correlates to and/or is dependent upon information acquired and communicated by the sensor 60. Additionally, the first signal 24 corresponds to an orientation of the vehicle 20 and/or the implement 40 (discussed further below). It is contemplated that the term "orientation" as used herein may be understood to be an angular position, attitude, and/or direction of an object (the vehicle 20 and/or the implement 40) in a space that the object occupies. The orientation of the vehicle 20 and/or the implement 40 may also be transmitted continuously, in real-time, as part of the measurements 23 and/or the first signal 24. Transmitting the measurements 23 and/or the first signal 24 from the vehicle ECU 22 to the implement ECU 42 allows for the implement 40 to be automatically updated with information corresponding to the vehicle 20 and/or the implement 40. It is contemplated that the implement ECU 42 may combine and/or process the measurements 23 and the first signal 24 together to improve determinations made by the implement ECU 42 when the first signal 24 is received by the implement ECU 42. Additionally, it is contemplated that the measurements 23 and/or the first signal 24 may be transmitted from the vehicle ECU 22 to the implement ECU 42 before and/or during performance of a work function by the implement 40. In this manner, operation of the implement 40 and/or performance of a work function by the implement 40 may be enhanced in real-time by transmission of the measurements 23 and/or the first signal 24.

The vehicle ECU 22 is also configured to control operation of the vehicle 20. In the disclosed embodiment, the vehicle ECU 22 may be configured to control movement of the vehicle 20 upon a surface. It is contemplated that the surface in which the vehicle 20 is operated upon and/or moves upon may be an inclined surface. To this end, the vehicle 20 includes the sensor 60. Additionally or alternatively, the vehicle 20 may include a plurality of sensors 60. However, the plurality of sensors 60 will be referred to herein as "the sensor 60" unless reference to the plurality of sensors 60 is otherwise necessary. In the disclosed embodiment, the sensor 60 may be mounted to and/or within the vehicle 20. Additionally or alternatively, the sensor 60 may be included as part of the vehicle ECU 42. The sensor 60 is configured to detect an orientation of the vehicle 20. Additionally or alternatively, an orientation of the implement 40 may be detected based upon an orientation of the vehicle 20. It is contemplated that the orientation of the implement 40 may be detected by application of an algorithm by one or more of the vehicle ECU 22 and the implement ECU 42. The algorithm may determine and/or estimate the orientation of the implement 40, which may be different from the orientation of the vehicle 20.

In the disclosed embodiment, the orientation of the vehicle 20 and/or the implement 40 corresponds to one or more of a pitch angle of the vehicle 20 and/or the implement 40, a roll angle of the vehicle 20 and/or the implement 40, and a yaw angle of the vehicle 20 and/or the implement 40. Accordingly, in the disclosed embodiment, a detected orientation 62 of the vehicle 20 and/or the implement 40 includes a determination of one or more of a pitch angle of the vehicle 20 and/or the implement 40, a roll angle of the vehicle 20 and/or the implement 40, and a yaw angle of the vehicle 20 and/or the implement 40. To this end, it is contemplated that the sensor 60 may be an inertial measurement unit (IMU), an inclinometer, and/or any device capable of determining the pitch angle of the vehicle 20 and/or the implement 40, the roll angle of the vehicle 20 and/or the implement 40, and the yaw angle of the vehicle 20 and/or the implement 40, which is compatible with the system 10. The sensor 60 is also configured to communicate with the vehicle 20. Particularly, the sensor 60 is configured to communicate with the vehicle ECU 22. Additionally or alternatively, the sensor 60 may be configured to communicate with the implement ECU 42. In this manner, as shown in FIG. 2, the sensor 60 communicates the detected orientation 62 of the vehicle 60 to the vehicle ECU 22, when the sensor 60 detects the detected orientation 62 of the vehicle 20. Additionally, it is contemplated that the detected orientation 62 of the implement 40 may be determined based upon the detected orientation of the vehicle 20. The algorithm applied by one or more of the vehicle ECU 22 and the implement ECU 42 may incorporate values corresponding to the detected orientation 62 of the vehicle 20 to determine the detected orientation 62 of the implement 40. It is contemplated that the detected orientation 62 of the vehicle 20 and/or the implement 40 may be determined before and/or during performance of a work function by the implement 40. Accordingly, operation of the implement 40 and/or performance of a work function by the implement 40 may be enhanced in real-time based upon the detected orientation 62 of the vehicle 20 and/or the implement 40.

As shown in FIGS. 1-2, the implement 40 is configured to function in combination with the vehicle 20. To this end, the implement 40 is configured to communicate with the vehicle 20. In the disclosed embodiment, the implement 40 includes one or more implement ECU (also understood as and/or referred to herein as the "implement electronic control system" and/or "second electronic control unit") 42. The implement ECU 42 is configured to communicate with the vehicle 20. Particularly, the implement ECU 42 is configured to communicate with the vehicle ECU 22. In this manner, as shown in FIG. 2, the implement ECU 42 may be configured to receive the measurements 23 and/or the first signal 24 transmitted by the vehicle ECU 22 to the implement ECU 42. Additionally or alternatively, as shown in FIG. 2, the implement ECU 42 may be configured to transmit a second signal 44 to the vehicle ECU 22. The second signal 44 may be configured to modify and/or control operation of the vehicle 20. Additionally or alternatively, the second signal 44 may be configured to function as a prompt and/or instruction sent to the vehicle ECU 22 for the vehicle ECU 22 to modify and/or control operation of the vehicle 20. In this manner, the second signal 44 may be configured to prompt and/or instruct the vehicle 20 and/or the vehicle ECU 42 to modify an orientation of the vehicle 20 and/or one or more of the TIM functions. The implement ECU 42 is also configured to control performance of one or more work function performed by the implement 40. It is contemplated that the term "work function" as used herein may be understood as a farm work activity, such as baling, plowing, tilling, seeding, spraying, swathing, and the like.

In the disclosed embodiment, the system 10 may include target parameters corresponding to an orientation of the vehicle 20 and/or the implement 40 (hereafter referred to as "the parameters"). The parameters are parameters which are optimal and/or required for efficient performance of a work function by the implement 40. For operation of the system 10, one or more TIM functions may be selected for consideration and/or control based upon one or more selected parameters. In the disclosed embodiment, an operator of the system 10 may select one or more of the TIM functions and one or more of the parameters. To this end, the system 10 may include a user interface (not shown) which the operator may use to select an appropriate TIM function and parameter. The user interface may be configured to communicate with and/or control the vehicle ECU 22. It is contemplated that the user interface may be a screen and/or monitor of a computing device within the vehicle 20, a remote computing device, a smartphone, a remote control, and/or the like. Additionally or alternatively, the vehicle ECU 22 may be configured to select the one or more TIM functions and the one or more parameters. Additionally or alternatively, the implement ECU 42 may be configured to select the one or more TIM functions and the one or more the parameters. However, for the purpose of description of the system 10, selection of the one or more TIM functions and one or more of the parameters will be referred to herein as being selected by an operator and/or the vehicle ECU 22. Additionally, for the purpose of description of the system 10, selection of the one or more TIM functions and the one or more parameters will be referred to herein as being selected by an operator of the user interface and/or an operator of the vehicle ECU 22.

It is contemplated that the parameters selected by the operator correspond to one or more of a pitch angle of the vehicle 20 and/or the implement 40, a roll angle of the vehicle 20 and/or the implement 40, and a yaw angle of the vehicle 20 and/or the implement 40. Additionally, it is contemplated that the parameters selected by the operator correspond to one or more of a pitch angle of the vehicle 20 and/or the implement 40, a roll angle of the vehicle 20 and/or the implement 40, and a yaw angle of the vehicle 20 and/or the implement 40 which are optimal and/or required for efficient performance of a work function by the implement 40. The vehicle ECU 22 is configured to transmit the first signal 24 to the implement ECU 42 if and/or when the detected orientation 62 of the vehicle 20 and/or the implement 40 is outside of the parameters set by the operator. Additionally or alternatively, the parameters selected by the operator may include one or more of a threshold pitch angle of the vehicle 20 and/or the implement 40, a threshold roll angle of the vehicle 20 and/or the implement 40, and a threshold yaw angle of the vehicle 20 and/or the implement 40. As such, the vehicle ECU 22 is configured to transmit the first signal 24 to the implement ECU 42 if and/or when the detected orientation 62 of the vehicle 20 and/or the implement 40 exceeds one or more of the threshold pitch angle of the vehicle 20 and/or the implement 40, the threshold roll angle of the vehicle 20 and/or the implement 40, and/or the threshold yaw angle of the vehicle 20 and/or implement 40 included by the parameters selected by the operator. To this end, the vehicle ECU 22 may include a calculation and/or diagnostic unit (referred to hereafter as "the calculation unit") 26 that is configured to calculate and/or determine whether the detected orientation 62 of the vehicle 20 and/or the implement 40 exceeds one or more of a threshold pitch angle of the vehicle 20 and/or the implement 40, a threshold roll angle of the vehicle 20 and/or the implement 40, and a threshold yaw angle of the vehicle 20 and/or the implement 40 included by the parameters selected by the operator. It is contemplated that the first signal 24 may vary dependent upon which of a pitch angle of the vehicle 20 and/or the implement 40, a roll angle of the vehicle 20 and/or the implement 40, and/or a yaw angle of the vehicle 20 and/or the implement 40 is outside of the parameters selected by the operator. Accordingly, the calculation unit 26 may also be configured to calculate and/or determine which of a threshold pitch angle of the vehicle 20 and/or the implement 40, a threshold roll angle of the vehicle 20 and/or the implement 40, and/or a threshold yaw angle of the vehicle 20 and/or the implement 40 included by the parameters selected by the operator has been exceeded. Additionally, the calculation unit 26 may also be configured to determine a type of first signal 24 to be sent from the vehicle ECU 22 to the implement ECU 42.

In the disclosed embodiment, the first signal 24 is configured for one or more of notifying the implement ECU 42 of the detected orientation 62 of the vehicle 20 and/or the implement 40, suspending a work function performed by the implement 40, and modifying operation of a work function performed by the implement 40. As such, upon receiving the first signal 24, the implement ECU 42 may be configured to process data corresponding to the detected orientation 62 of the vehicle 20 and/or the implement 40, suspend a work function of the implement 40, and/or modify operation of a work function of the implement 40. Additionally or alternatively, upon receiving the first signal 24, the implement ECU 42 may be configured to process data corresponding to the detected orientation 62 of the vehicle 20 and/or the implement 40 in combination with data corresponding to the measurements 23 received from the vehicle ECU 22. Processing data corresponding to the detected orientation 62 of the vehicle 20 and/or the implement 40 in combination with data corresponding to the measurements 23 allows the implement ECU 42 to consider the detected orientation 62 of the vehicle 20 and/or the implement 40 in view of the measurements 23. By considering the detected orientation of the vehicle 20 and/or the implement 40 in view of the measurements 23, the implement ECU 42 may better determine whether to suspend a work function of the implement 40 and/or modify operation of a work function of the implement 40. For example, upon receiving the first signal 24, the implement ECU 42 may or may not determine that suspending a work function of the implement 40 and/or modifying operation of a work function of the implement 40 is necessary in view of a value for one or more of the measurements 23.

Additionally or alternatively, the implement ECU 42 may send the second signal 44 to the vehicle ECU 22 in response to receiving the measurements 23 and/or the first signal 24. To this end, the second signal 44 may be configured to prompt and/or instruct the vehicle 20 and/or the vehicle ECU 22 to modify an orientation of the vehicle 20 and/or one or more of the TIM functions. For example, upon receiving the first signal 24, the implement ECU 42 may or may not determine that modifying an orientation of the vehicle 20 and/or one or more of the TIM functions is necessary in view of a value for one or more of the measurements 23. In this manner, the second signal 44 may be configured to modify an orientation of the vehicle 20 and/or one or more of the TIM functions such that these aspects of the vehicle 20 are optimized for efficient performance of a work function by the implement 40. Additionally or alternatively, the second signal 44 may be configured to modify the TIM function selected by the operator such that the selected TIM function is optimized for efficient performance of a work function by the implement 40. It is contemplated that optimization of a TIM function may be dependent upon and/or related to the detected orientation 62 of the vehicle 20 and/or implement 40 and the measurements 23. In this manner, the measurements 23 and/or the first signal 24 are configured for notifying the implement ECU 42 of a detected orientation 62 of the vehicle 20 and/or the implement 40, suspending a work function performed by the implement 40, and/or modifying operation of a work function performed by the implement 40. Additionally or alternatively, in this manner, the measurements 23 and/or the first signal 24 may be configured to cause an aspect, such as one or more of the TIM functions, of the vehicle 20 to be modified. It is contemplated that the operator may select the configuration of the implement ECU 42, such that the operator may select whether the implement ECU 42 is configured to be reactionary based upon the measurements 23 and/or the first signal 24 transmitted by the vehicle ECU 22, or whether the implement 42 is configured to make determinations based upon the measurements 23 and/or the first signal 24 transmitted by the vehicle ECU 22.

In the disclosed embodiment, the first signal 24 may be configured to be in the form of an error code. It is contemplated that the term "error code" as used herein may be understood to be a numerical value, alphanumerical data, a phrase including one or more grammatically-linked words, and/or the like, which is configured to specify improper functioning of a device or system to facilitate a determination of a cause for the improper functioning of the device or system and/or to facilitate a determination of a solution for the improper functioning of the device or system. Providing the first signal 24 in the form of an error code allows for a more appropriate and efficient countermeasure to be taken by the implement ECU 42 and/or the implement 40. Additionally, providing the first signal 24 in the form of an error code allows for an operator of the system 10 and/or a manufacturer of the vehicle 20 and the implement 40 to be fully compliant with the ISOBUS standard, as well as capable of configuring the system 10 for specific needs of the operator and/or the manufacturer (discussed further below). The error code may correspond to a calculation and/or determination made by the calculation unit 26. As such, the error code may indicate which of the threshold pitch angle of the vehicle 20 and/or the implement 40, the threshold roll angle of the vehicle 20 and/or the implement 40, and/or the threshold yaw angle of the vehicle 20 and/or implement 40 included by the parameters selected by the operator has been exceeded, as determined by the calculation unit 26 of the vehicle ECU 22. Additionally, the error code may indicate the one or more TIM functions selected by the operator. In this manner, the error code may indicate the TIM functions that may be affected and/or controlled due to a detected orientation 62 of the vehicle 20 and/or the implement 40 that exceeds the one or more parameters selected by the operator. Additionally or alternatively, the error code may indicate a solution for an orientation of the vehicle 20 and/or the implement 40 exceeding the threshold pitch angle of the vehicle 20 and/or the implement 40, the threshold roll angle of the vehicle 20 and/or the implement 40, and/or the threshold yaw angle of the vehicle 20 and/or the implement 40 included by the parameters set by the vehicle ECU 22. Additionally or alternatively, the operator may be able to select whether the first signal 24 sent by the vehicle ECU 22 is only configured to be in the form of an error code, or whether the first signal 24 sent by the vehicle ECU 22 is configured to suspend a work function of the implement 40 and/or modify operation of a work function performed by the implement 40 in a closed loop (i.e. whether the implement ECU 42 is configured to be reactionary or whether the implement ECU 42 is configured to make determinations).

In the disclosed embodiment, the error code may be configured to include a value within a range of values that are defined as manufacturer specific and/or dedicated to manufacturer specific needs by the ISOBUS standard. Specifically, the error code may include a value within a range of $16_{16}$ to $1D_{16}$, which is defined as being manufacturer specific according to the Agricultural Industry Electronics Foundation (AEF) International Guideline, ISOBUS Automation Principles, Guideline Number 023. By the error code being configured to include a value within a range of values that are defined as manufacturer specific, an operator of the system 10 and/or a manufacturer of the vehicle 20 and the implement 40 is capable of being fully compliant with the ISOBUS standard, as well as capable of configuring the system 10 for specific needs of the operator and/or the manufacturer. Alternatively, the error code may be configured to include a value independent of that specified by a manufacturer of one or more of the vehicle 20 and the implement 40.

It is contemplated that the system 10 may also be configured for accumulating data corresponding to a surface in which the vehicle 20 and/or the implement 40 are moving upon. Particularly, the system 10 may be configured for generating a map of the surface in which the vehicle 20 and/or the implement 40 are moving upon. To this end, the implement ECU 42 is configured to generate and store data corresponding to the detected orientation 62 of the vehicle 20 and/or the implement 40. The implement ECU 42 may then generate a map of the surface based upon the data generated and stored corresponding to the detected orientation 62 of the vehicle 20 and/or the implement 40. Generating a map of the surface allows one or more of the implement ECU 42 and the vehicle ECU 22 to anticipate an inclined surface and/or an orientation of the vehicle 20 and/or the implement 40 that may be unsuitable and/or sub-optimal for efficient performance of a work function by the implement 40.

In a first operative example of the system 10, as shown in FIG. 1, the implement 40 may be a baler and a work function performed by the implement 40 may be releasing a bale 90 of material which has been collected along a windrow. The operator selects one or more TIM function for consideration and one or more parameter corresponding to an orientation of the vehicle 20, which, in the first operative example, may include auxiliary valve control (for baler gate management) and a threshold pitch angle of the vehicle 20. In the disclosed embodiment, the threshold pitch angle of the vehicle 20 may be within a range of 10 degrees to 20 degrees, but may preferably be a threshold pitch angle of 15 degrees. Additionally or alternatively, in a second operative example of the system 10, the implement 40 may be a seeder (not shown) and a work function performed by the implement 40 may be distributing seeds to soil. In the second operative example, the TIM function selected may be rear hitch control and the one or more parameter selected corresponding to an orientation of the vehicle 20 may be a threshold pitch angle of the vehicle 20, which may be within a range of 1 degree to 10 degrees, but may preferably be a threshold pitch angle of 3 degrees.

As the implement 40 performs a work function, the sensor 60 detects the pitch angle of the vehicle 20. Once the pitch angle of the vehicle 20 is detected, the sensor 60 communicates the pitch angle (the detected orientation 62) of the vehicle 20 to the vehicle ECU 22. The calculation unit 26 of the vehicle ECU 22 calculates and/or determines whether the pitch angle (the detected orientation 62) of the vehicle 20 detected by the sensor 60 exceeds the threshold pitch angle of the vehicle 20 included by the parameters selected by the operator. If it is determined that the pitch angle (the detected orientation 62) of the vehicle 20 detected by the sensor 60 exceeds the threshold pitch angle of the vehicle 20 included by the parameters selected by the operator, the vehicle ECU 22 transmits the first signal 24 to the implement ECU 42. In this example, the first signal 24 is an error code including values corresponding to the selected TIM function and/or the selected parameter, which are the auxiliary valve control and/or the pitch angle of the vehicle 20. Additionally or alternatively, if it is determined that the pitch angle (the detected orientation 62) of the vehicle 20 exceeds the threshold pitch angle of the vehicle 20 included by the parameters selected by the operator, the calculation unit 26 of the vehicle ECU 22 may calculate and/or determine a solution corresponding to the detected orientation 62 of the vehicle 20, prior to the vehicle ECU 22 subsequently transmitting the first signal 24 to the implement ECU 42. In response to the first signal 24 transmitted by the vehicle ECU 22 to the implement ECU 42, the implement ECU 42 takes the detected orientation 62 of the vehicle 20 into account, suspends a work function of the implement 40, modifies operation of a work function and/or the implement 40, and/or sends the second signal 44 to the vehicle ECU 22. For example, upon receiving the first signal 24, the implement may adjust auxiliary valve control to manage the baler gate, such that a bale is not released on a hill or the like in a disadvantageous manner. Additionally or alternatively, the implement ECU 42 may take the detected orientation 62 of the vehicle 20 into account, in view of the measurements 23, and determine whether to suspend a work function of the implement 40, modify operation of a work function and/or the implement 40, and/or send the second signal 44 to the vehicle ECU 22. In this example, the second signal 44 may include instruction for adjusting rear hitch control. If the pitch angle (the detected orientation 62) of the vehicle 20 detected by the sensor 60 does not exceed the threshold pitch angle of the vehicle 20 included by the parameters set by the vehicle ECU 22, the vehicle ECU 22 does not transmit the first signal 24 (in the form of a specific error code) to the implement ECU 42 and the implement 40 may commence and/or resume performance of the work function, without further modification of the performance of the work function based upon the detected orientation 62 of the vehicle 20. In this manner, the system 10 is configured to automatically detect an orientation of the vehicle 20 and control operation of the implement 40 in correspondence with the detected orientation 62 of the vehicle 20, in order to enhance operation of the implement 40 and/or performance of a work function by the implement 40, without requiring a user or the like for additional judgment and/or guidance.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of the system may be transposed, alone or in combination, to a method and/or an apparatus and vice versa.

The invention claimed is:

1. A system for controlling operation of a work machine, the work machine configured to operate in combination with a vehicle to perform a work function, the system comprising:
   a sensor included by the vehicle, the sensor configured to detect an orientation of the vehicle;
   a vehicle electronic control unit configured to communicate with the sensor and with the work machine;
   a work machine electronic control unit configured to communicate with the vehicle and to control performance of a work function of the work machine; and
   wherein, the sensor is configured to communicate a detected orientation of the vehicle to the vehicle electronic control unit, the vehicle electronic control unit is configured to transmit a signal to the work machine electronic control unit if the detected orientation of the vehicle is outside of target parameters corresponding to an orientation of the vehicle, and the signal is configured for one or more of notifying the work machine electronic control unit of the detected orientation of the vehicle and modifying operation of a work function performed by the work machine,
   wherein the system comprises a calculation unit configured to process the detected orientation of the vehicle, wherein the signal transmitted from the vehicle electronic control unit to the work machine electronic control unit is configured to be an error code corresponding to the processing of the detected orientation by the calculation unit, the error code being configured to include a value within a range of values that are defined as manufacturer specific by international standard ISO 11783.

2. The system according to claim 1, wherein the vehicle electronic control unit is configured so that an operator selects the parameters corresponding to an orientation of the vehicle.

3. The system according to claim 1, wherein the vehicle electronic control unit is configured so that an operator selects functions of the vehicle to be considered with respect to the parameters corresponding to an orientation of the vehicle.

4. The system according to claim 1, wherein the sensor is configured to determine one or more of a pitch angle of the vehicle, a roll angle of the vehicle, and a yaw angle of the vehicle.

5. The system according to claim 1, wherein the parameters corresponding to an orientation of the vehicle correspond to one or more of a pitch angle of the vehicle, a roll angle of the vehicle, and a yaw angle of the vehicle.

6. The system according to claim 1, wherein the vehicle electronic control unit is configured to transmit measurements corresponding to one or more of auxiliary valve flow or auxiliary valve state of the vehicle, front power take-off RPM of the vehicle, rear power take-off RPM of the vehicle, engine RPM of the vehicle, front hitch position of the vehicle, rear hitch position of the vehicle, and speed of the vehicle.

7. The system according to claim 1, wherein the vehicle electronic control unit is configured to detect an orientation of the work machine based upon the detected orientation of the vehicle.

8. The system according to claim 7, wherein the vehicle electronic control unit is configured so that an operator selects parameters corresponding to an orientation of one or more of the vehicle and the work machine.

9. A method for controlling operation of a work machine, the work machine configured to operate in combination with a vehicle to perform a work function, the method comprising:
- selecting parameters corresponding to an orientation of the vehicle;
- detecting an orientation of the vehicle with a sensor included by the vehicle;
- communicating a detected orientation of the vehicle to the vehicle electronic control unit; and
- transmitting a signal from the vehicle electronic control unit to the work machine electronic control unit if the detected orientation of the vehicle is outside of the parameters corresponding to an orientation of the vehicle, the signal being configured for one or more of:
  - notifying the work machine electronic control unit of the detected orientation of the vehicle; and
  - modifying operation of a work function performed by the work machine,
- the method comprising processing the detected orientation of the vehicle with a calculation unit, wherein transmitting a signal from the vehicle electronic control unit to the work machine electronic control unit includes the signal being configured to be an error code corresponding to the processing of the detected orientation by the calculation unit, the signal being configured to be in the form of an error code includes the error code being configured to comprise a value within a range of values that are defined as manufacturer specific by international standard ISO 11783.

10. The method according to claim 9, wherein detecting an orientation of the vehicle with the sensor includes determining one or more of a pitch angle of the vehicle, a roll angle of the vehicle, and a yaw angle of the vehicle.

11. The method according to claim 9, wherein selecting parameters corresponding to an orientation of the vehicle includes the parameters corresponding to one or more of a pitch angle of the vehicle, a roll angle of the vehicle, and a yaw angle of the vehicle.

\* \* \* \* \*